United States Patent
Sakai et al.

(10) Patent No.: US 12,466,461 B2
(45) Date of Patent: Nov. 11, 2025

(54) STEERING DEVICE

(71) Applicant: AISIN CORPORATION, Aichi (JP)

(72) Inventors: Kosuke Sakai, Kariya (JP); Soichiro Iwanaga, Kariya (JP); Toshihiro Muraki, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/839,777

(22) PCT Filed: May 11, 2023

(86) PCT No.: PCT/JP2023/017805
§ 371 (c)(1),
(2) Date: Aug. 20, 2024

(87) PCT Pub. No.: WO2023/223942
PCT Pub. Date: Nov. 23, 2023

(65) Prior Publication Data
US 2025/0171071 A1     May 29, 2025

(30) Foreign Application Priority Data
May 18, 2022   (JP) .................................. 2022-081238

(51) Int. Cl.
*B62D 1/181*   (2006.01)
*B62D 1/19*   (2006.01)

(52) U.S. Cl.
CPC ............ *B62D 1/181* (2013.01); *B62D 1/195* (2013.01)

(58) Field of Classification Search
CPC ................................ B62D 1/181; B62D 1/195
See application file for complete search history.

(56) References Cited

U.S. PATENT DOCUMENTS

| 10,919,561 B2 * | 2/2021 | Sekiguchi | .............. B62D 1/185 |
| 10,953,910 B2 * | 3/2021 | Sekiguchi | .............. B62D 1/192 |

(Continued)

FOREIGN PATENT DOCUMENTS

| CN | 115123370 A | * | 9/2022 | ............. B62D 1/181 |
| CN | 116461594 A | * | 7/2023 | ............. B62D 1/181 |

(Continued)

OTHER PUBLICATIONS

International Search Report for PCT/JP2023/017805 dated Jul. 18, 2023.

*Primary Examiner* — Drew J Brown
(74) *Attorney, Agent, or Firm* — Sughrue Mion, PLLC

(57) ABSTRACT

A steering device including a tube, a moving member, a drive device that moves the moving member in the axial direction, a first fixing member provided on one first member that is either the tube or the moving member, and fixes the tube to the moving member, and a restriction portion on the second member that is the other of the tube or the moving member, is separated from the first fixing member in the axial direction, and restricts the tube and moving member relatively rotating about a rotational center axis intersecting the steering shaft axis. When a predetermined load acts on the tube in a direction in which the first member is relatively moved in the axial direction with respect to the second member, either the first member or the second member plastically deforms a deformation portion provided on another of either the first member or the second member.

5 Claims, 8 Drawing Sheets

(56) References Cited

U.S. PATENT DOCUMENTS

| | | | | |
|---|---|---|---|---|
| 10,953,911 B2* | 3/2021 | Sekiguchi | ............... | B62D 1/185 |
| 2007/0151392 A1 | 7/2007 | Oshita et al. | | |
| 2015/0232117 A1* | 8/2015 | Stinebring | ............. | B62D 1/181 |
| | | | | 74/493 |
| 2019/0126968 A1* | 5/2019 | Messing | ................. | B62D 1/181 |
| 2019/0225254 A1 | 7/2019 | Ishimura et al. | | |
| 2019/0225255 A1 | 7/2019 | Ishimura et al. | | |
| 2020/0039567 A1* | 2/2020 | Sekiguchi | ............... | B62D 1/192 |

FOREIGN PATENT DOCUMENTS

| | | |
|---|---|---|
| JP | 2007-168569 A | 7/2007 |
| JP | 2017-119484 A | 7/2017 |
| JP | 2019-127176 A | 8/2019 |
| JP | 2019-127182 A | 8/2019 |

* cited by examiner

STEERING DEVICE

CROSS REFERENCE TO RELATED APPLICATIONS

This application is a National Stage of International Application No. PCT/JP2023/017805 filed May 11, 2023, claiming priority based on Japanese Patent Application No. 2022-081238 filed May 18, 2022, the entire contents of which are incorporated in their entirety.

TECHNICAL FIELD

Embodiments of the present disclosure relate to a steering device.

BACKGROUND ART

Conventionally, a steering device includes a telescopic mechanism that brings a steering wheel closer to or moves away from a driver, and a tilt mechanism that adjusts a tilt angle of the steering wheel. Moreover, there is known a steering device, for example, including a collision energy absorbing mechanism that absorbs collision energy at a time of collision of a vehicle and reduces reaction force against a driver (Patent Literature 1).

For example, two energy absorbing members are disposed on both left and right sides of a tube that rotatably holds a steering shaft. Each of the two energy absorbing members has a folded portion formed by being folded back in a U shape or an arc shape. At the time of the collision of the vehicle, the energy absorbing member absorbs the collision energy by deforming so as to displace a position of the folded portion forward with an attachment portion fixed to a vehicle body as a stationary base point.

CITATIONS LIST

Patent Literature

Patent Literature 1: JP 2017-119484 A

SUMMARY OF DISCLOSURE

Technical Problems

However, in a conventional configuration, because two energy absorbing members are disposed on both left and right sides of the tube, more space in the vehicle is occupied by the steering device. That is, mountability of the steering device on the vehicle may be deteriorated.

Moreover, in the telescopic mechanism, a moving member is fixed to the tube by a fixing member, and the moving member is moved by a drive device. However, depending on arrangement of the fixing member and the moving member, when the drive device moves the moving member, rotational moment is generated in the tube and the moving member, and thus there is a possibility that smooth movement of the moving member, the tube, and the steering shaft is hindered.

Therefore, the present disclosure has been made in view of the above, and provides a steering device having good mountability on a vehicle and can smoothly move a steering shaft in an axial direction.

Solutions to Problems

A steering device according to embodiments of the present disclosure includes, as an example, a tube in which a steering shaft is attached so as to be rotatable about an axis of the steering shaft, a housing that holds the tube movably in an axial direction along an axis of the steering shaft, a moving member, a drive device that is attached to the housing and moves the moving member in the axial direction, a first fixing member that is provided on one first member that is either one of the tube and the moving member, and fixes the tube and the moving member to each other, and a restriction portion that is provided on the second member that is either another one of the tube and the moving member, is separated from the first fixing member in the axial direction, and restricts the tube and the moving member relatively rotating about a rotational center axis intersecting an axis of the steering shaft, in which when predetermined load acts on the tube in a direction in which the first member is relatively moved in a first direction included in the axial direction with respect to the second member, one of either the first member or the second member plastically deforms a deformation portion provided on another of either the first member or the second member along with movement of the first member with respect to the second member. Therefore, as an example, because collision energy of a vehicle, for example, is absorbed by plastic deformation of one deformation portion, a space occupied by the steering device can be reduced, and mountability on the vehicle can be improved. Furthermore, due to arrangement of the moving member moved by the drive device and the first fixing member fixing the moving member and the tube, a force for rotating about the above-described rotational center axis may be generated when the drive device moves the moving member in the axial direction. However, the first fixing member and the restriction portion are separated from each other in the axial direction, and inhibit the tube and the moving member from relatively rotating by the above-described rotating force when the drive device moves the moving member in the axial direction. Therefore, the steering device can smoothly move the moving member, the tube, and the steering shaft in the axial direction regardless of the arrangement of the moving member and the first fixing member.

In the steering device described above, as an example, the first fixing member passes through a first hole provided in the first member, and a first notch provided in the second member and opened in the first direction, and fixes the tube and the moving member to each other, the restriction portion passes through a second notch provided in the first member and opened in a second direction opposite to the first direction, and restricts the tube and the moving member from relatively rotating about the rotational center axis, and when the predetermined load acts on the tube in a direction in which the first member is relatively moved in the first direction with respect to the second member, the first fixing member is released from the first notch in the first direction, and the restriction portion is released from the second notch in the second direction. Therefore, as an example, because the first fixing member and the restriction portion are disposed through the first notch and the second notch, the steering device can inhibit the first fixing member and the restriction portion from hindering operation of absorbing the collision energy described above.

In the steering device described above, as an example, the drive device includes a screw extending in the axial direction, and a drive mechanism that rotates the screw about an axis of the screw, the moving member includes a nut attached to the screw and moves in the axial direction along with rotation of the screw, and the nut and the first fixing member are separated from each other in a direction intersecting the axial direction. Therefore, as an example, in a case where the nut and the first fixing member are disposed at the positions, the above-described force for rotating about the above-described rotational center axis is generated when the drive device moves the nut in the axial direction. However, the first fixing member and the restriction portion inhibit the tube and the moving member from relatively rotating by the above-described rotating force when the drive device moves the nut in the axial direction. Therefore, the steering device can smoothly move the moving member, the tube, and the steering shaft in the axial direction regardless of the arrangement of the nut and the first fixing member.

In the steering device described above, as an example, the second member includes a deformable protrusion that restricts the first fixing member passing through the first notch from moving in the first direction with respect to the second member. Therefore, as an example, in a normal state where load that causes the first fixing member to plastically deform the deformable protrusion does not act on the tube, the deformable protrusion restricts relative movement of the first member and the second member. Therefore, in the normal state, the tube and the steering shaft can smoothly move in the axial direction along with the movement of the moving member by the drive device. Moreover, as compared to a case where the deformable protrusion is broken, the deformable protrusion can stabilize a magnitude of load input to the tube by being plastically deformed by the first fixing member, the load starting operation of absorbing the collision energy described above.

In the steering device described above, as an example, the restriction portion includes a second fixing member that passes through the second notch and a second hole provided in the second member, and fixes the tube and the moving member to each other. Therefore, as an example, in the normal state, the tube and the moving member are fixed by the two fixing members, the first fixing member and the second fixing member. Therefore, rigidity of the steering device at the normal state is improved.

In the steering device described above, as an example, the restriction portion includes an engagement protrusion protruding from the second member so as to pass through the second notch. Therefore, as an example, the steering device is not necessary to be provided with the restriction portion as a part different from the second member, and the number of parts can be reduced.

DESCRIPTION OF EMBODIMENTS

First Embodiment

Hereinafter, a first embodiment will be described with reference to FIGS. 1 to 6. Note that, in the present specification, components according to the embodiments and descriptions of the components may be described in a plurality of expressions. The components and description thereof are an example, and are not limited by the expression in the present specification. Components may also be identified with names different from those in the present specification. Furthermore, the components may be described with expression different from the expression in the present specification.

Figure 1:
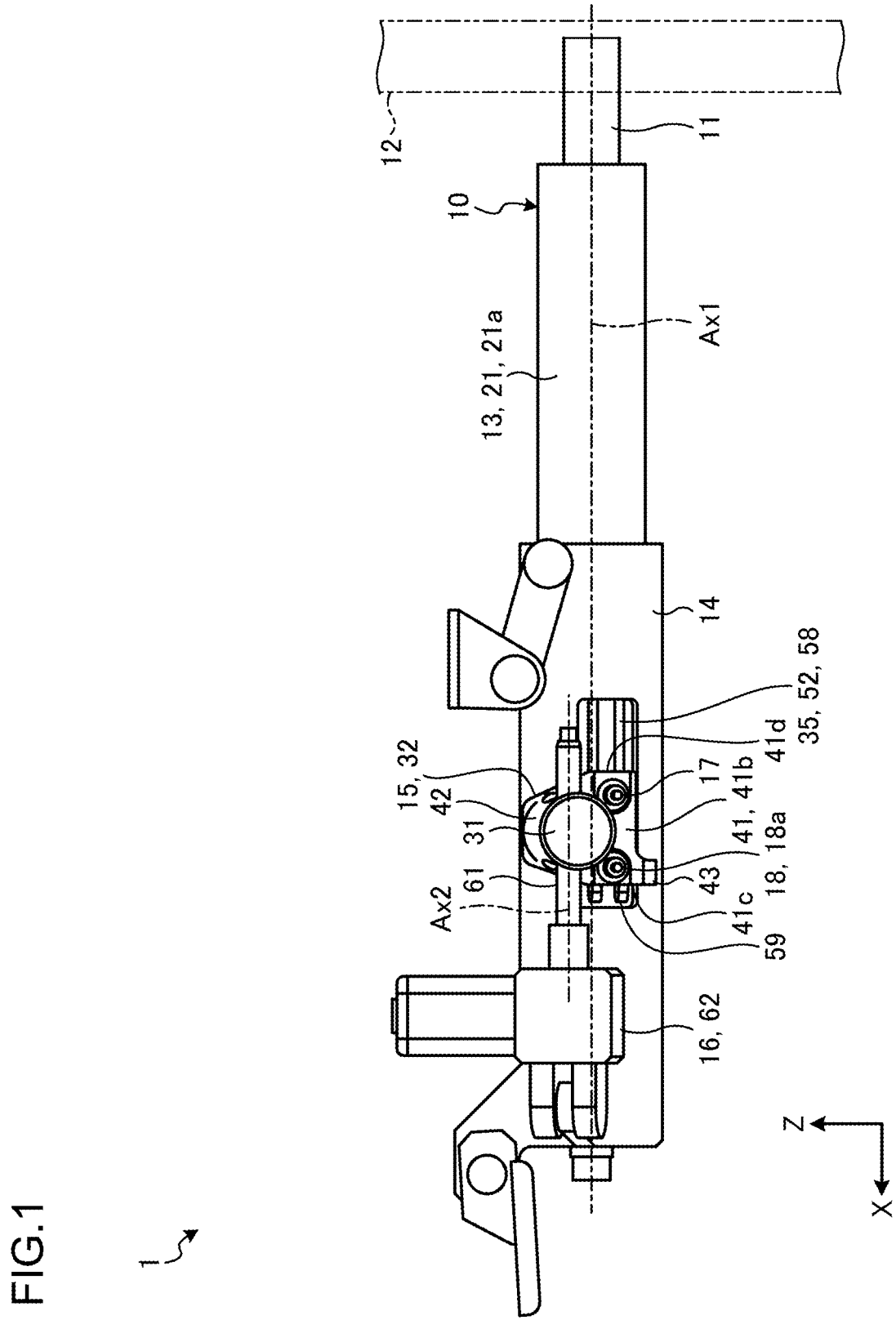
FIG. 1 is a side view showing a steering device according to a first embodiment.

FIG. 1 is a side view showing a steering device 10 according to the first embodiment. The steering device 10 is mounted in a vehicle 1 such as an automobile. Note that the steering device 10 is not limited to this example.

As shown in FIG. 1, the steering device 10 includes a steering shaft 11, a steering wheel 12, a tube 13, a housing 14, a moving member 15, a drive device 16, a first fixing member 17, and a restriction portion 18. Note that the steering device 10 is not limited to this example. In the present embodiment, the tube 13 is an example of a second member, and the moving member 15 is an example of a first member.

The steering shaft 11 is formed in a substantially columnar shape. In the present specification, for convenience, a direction along an axis Ax1 of the steering shaft 11 is defined as an axial direction, a direction orthogonal to the axis Ax1 is defined as a radial direction, and a direction rotating about the axis Ax1 is defined as a circumferential direction.

Moreover, in the present specification, an X axis, a Y axis, and a Z axis are defined for convenience. The X axis, the Y axis, and the Z axis are orthogonal to each other. The X axis is provided along the axis Ax1. The Y axis is provided along a right-left direction of the vehicle 1.

Moreover, in the present specification, an X direction, a Y direction, and a Z direction are defined. The X direction is a direction along the X axis and includes a +X direction denoted by an arrow of the X axis and a −X direction that is an opposite direction of the arrow of the X axis. The Y direction is a direction along the Y axis and includes a +Y direction denoted by an arrow of the Y axis and a −Y direction that is an opposite direction of the arrow of the Y axis. The Z direction is a direction along the Z axis and includes a +Z direction denoted by an arrow of the Z axis and a −Z direction that is an opposite direction of the arrow of the Z axis. The X direction is equal to the axial direction. Furthermore, the Y direction and the Z direction are included in the radial direction.

The steering shaft 11 may swing by a tilt mechanism of the steering device 10. In a case where the axis Ax1 is horizontal, the +X direction is a front direction of the vehicle 1, and the −X direction is a rear direction of the vehicle 1. Furthermore, the +Z direction is an upward direction of the vehicle 1, and the −Z direction is a downward direction of the vehicle 1. The X direction and the Z direction are inclined with respect to a front-rear direction and an up-down direction of the vehicle 1 according to a tilt the steering shaft 11.

The steering wheel 12 is attached to an end of the steering shaft 11 in the −X direction. The steering shaft 11 and the steering wheel 12 are integrally rotatable about the axis Ax1.

Figure 2:
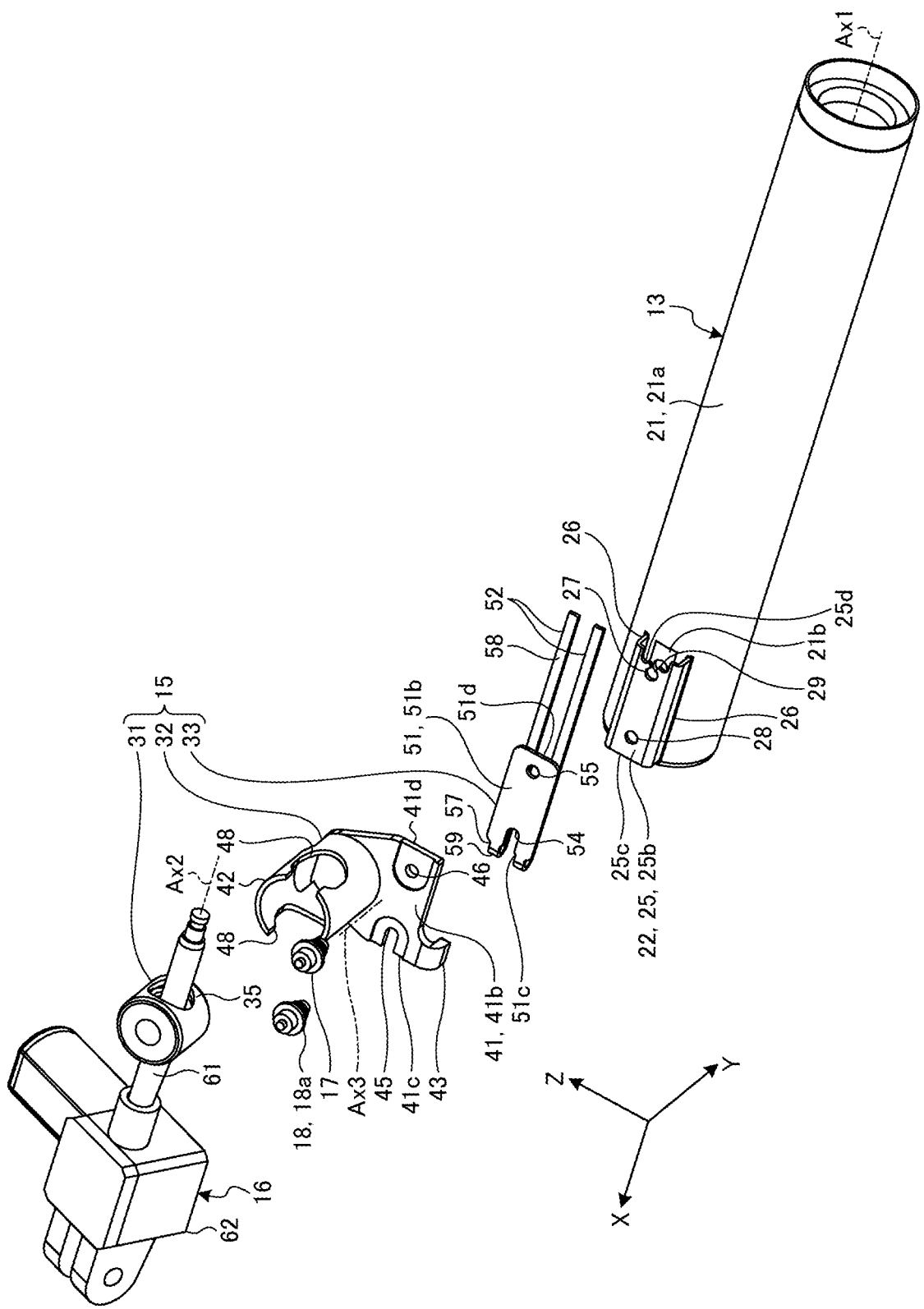
FIG. 2 is an exploded perspective view showing a tube, moving member, and drive device according to the first embodiment.

FIG. 2 is an exploded perspective view showing the tube 13, moving member 15, and drive device 16 according to the first embodiment. As shown in FIG. 2, the tube 13 includes an inner tube 21 and a stay 22.

The inner tube 21 is made of metal, for example, and is formed in a substantially cylindrical shape extending along the axis Ax1. The steering shaft 11 is attached inside the inner tube 21 so as to be rotatable about the axis Ax1. Both ends of the steering shaft 11 in the X direction protrude from both ends of the inner tube 21 in the X direction.

The inner tube 21 has an outer surface 21a. The outer surface 21a is a substantially cylindrical curved surface facing outward in the radial direction. A groove 21b is provided on the outer surface 21a, in a vicinity of an end of the inner tube 21 in the +X direction. The groove 21b is recessed inward in the radial direction from the outer surface 21a and extends substantially in the axial direction.

The stay 22 is attached to the outer surface 21a, in the vicinity of the end of the inner tube 21 in the +X direction. The stay 22 is attached to, for example, an end of the outer surface 21a in the −Y direction. The stay 22 is made of metal, for example, and has an outer wall 25 and two side walls 26.

Figure 3:
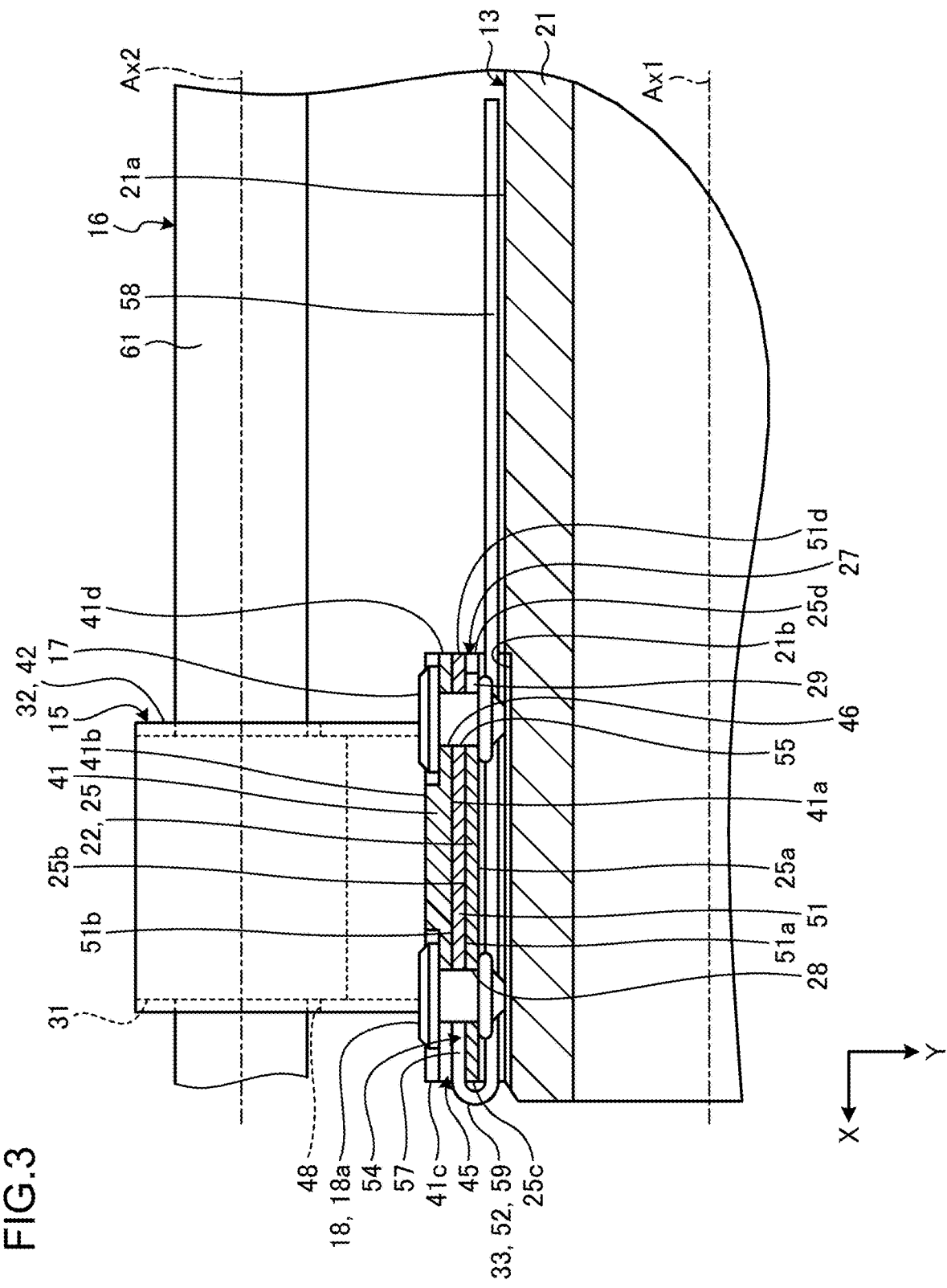
FIG. 3 is a cross-sectional view showing a part of the tube, moving member, and drive device according to the first embodiment.

FIG. 3 is a cross-sectional view showing a part of the tube 13, moving member 15, and drive device 16 according to the first embodiment. The outer wall 25 is formed in a substantially rectangular plate shape extending in the axial direction. The outer wall 25 has an inner surface 25a, an outer surface 25b, a front edge 25c, and a rear edge 25d.

The inner surface 25a is formed substantially flat and faces inward in the radial direction. The inner surface 25a faces, for example, substantially in the +Y direction. The outer surface 25b is positioned on an opposite side of the inner surface 25a. The outer surface 25b is formed substantially flat and faces outward in the radial direction. The outer surface 25b faces, for example, substantially in the −Y direction. The front edge 25c is provided at an end of the outer wall 25 in the +X direction. The rear edge 25d is positioned on an opposite side of the front edge 25c.

As shown in FIG. 2, the two side walls 26 extend substantially in parallel from both ends of the outer wall 25 in the circumferential direction toward the inner tube 21. An end of each of the side walls 26 on an inner side in the radial direction is fixed to the inner tube 21 by welding, for example. In the circumferential direction, the groove 21b of the inner tube 21 is positioned between the two side walls 26.

Figure 4:
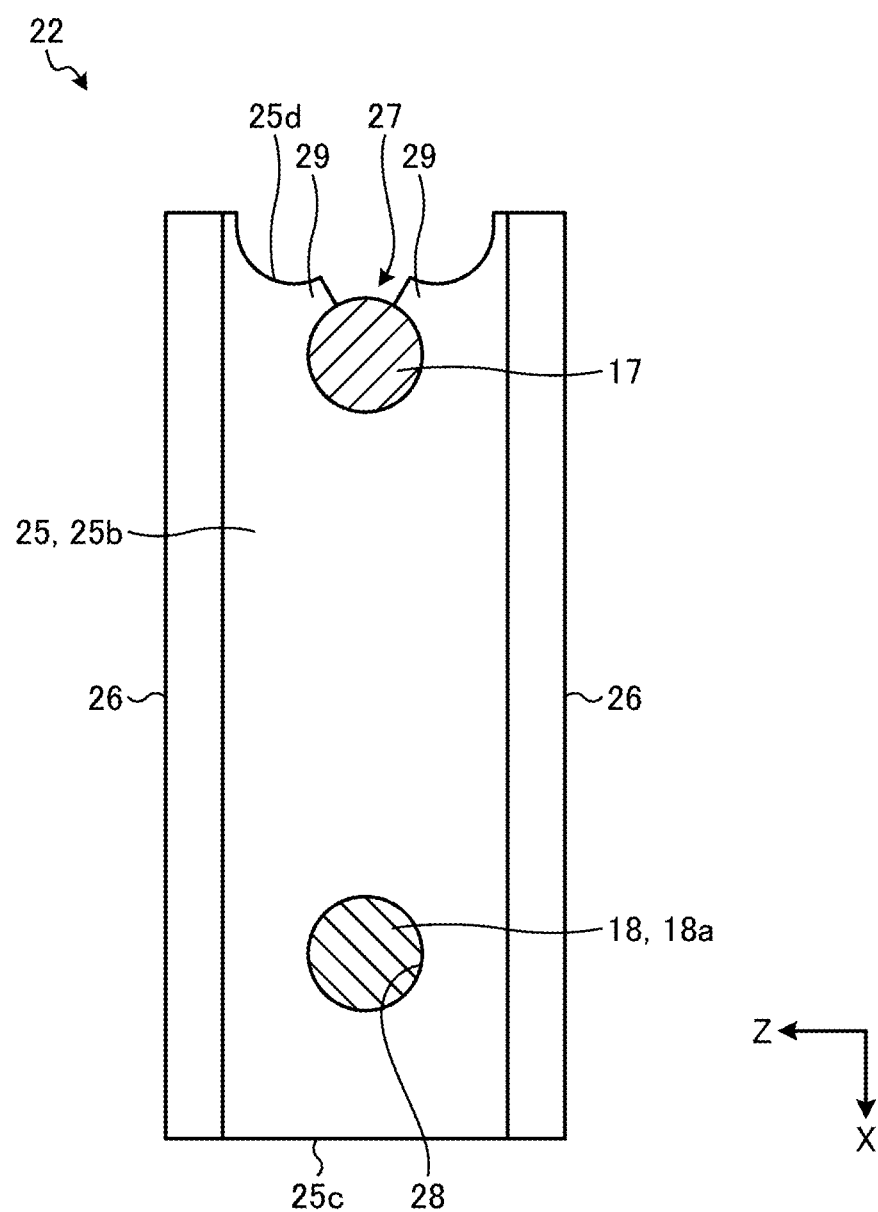
FIG. 4 is a side view showing a stay according to the first embodiment.

FIG. 4 is a side view showing the stay 22 according to the first embodiment. As shown in FIG. 4, the outer wall 25 is provided with a notch 27 and a hole 28. The notch 27 is an example of a first notch. The hole 28 is an example of a second hole.

The notch 27 and the hole 28 penetrate the outer wall 25 substantially in the radial direction (substantially in the Y direction) and are open to the inner surface 25a and the outer surface 25b. The notch 27 communicates with the rear edge 25d and is opened in the −X direction. In the present embodiment, the −X direction is an example of a first direction. The hole 28 is a so-called round hole and is separated in the axial direction from an edge of the outer wall 25 and the notch 27.

The notch 27 and the hole 28 are linearly arranged at an interval in the X direction. In other words, the notch 27 and the hole 28 are disposed at substantially the same position in the circumferential direction. The hole 28 is separated from the notch 27 in the +X direction.

The stay 22 further includes two claws 29. The claws 29 are an example of a deformable protrusion. The two claws 29 protrude from two facing edges of the notch 27 in a vicinity of the rear edge 25d. The notch 27 is narrowed at a portion where the claws 29 are provided.

As shown in FIG. 1, the housing 14 houses a part of the tube 13. Another part of the tube 13 protrudes from an end of the housing 14 in the −X direction. The housing 14 holds the tube 13 movably in the axial direction. The housing 14 exposes the stay 22 to an outside of the housing 14.

The housing 14 is attached to a vehicle body of the vehicle 1 via, for example, the tilt mechanism. The tilt mechanism changes tilt angles of the steering shaft 11, the steering wheel 12, and the tube 13 by swinging the housing 14.

The moving member 15 is attached to the tube 13 and can move integrally with the tube 13 in the axial direction. As shown in FIG. 2, the moving member 15 includes a nut 31, an attachment 32, and an EA plate 33.

The nut 31 is formed in, for example, a block shape having a substantially cylindrical diameter. Note that the nut 31 is not limited to this example. A threaded hole 35 is provided in the nut 31. The threaded hole 35 penetrates the nut 31 in the axial direction. An internal thread is provided on an inner surface of the threaded hole 35.

The attachment 32 is made of metal, for example, and has a plate portion 41, a cylindrical portion 42, and an auxiliary claw 43. Note that the attachment 32 is not limited to this example. The plate portion 41 is formed in a plate shape substantially parallel to the outer wall 25 of the stay 22. As shown in FIG. 3, the plate portion 41 has an inner surface 41a, an outer surface 41b, a front edge 41c, and a rear edge 41d.

The inner surface 41a is formed substantially flat and faces inward in the radial direction (substantially in the +Y direction). The inner surface 41a of the plate portion 41 and the outer surface 25b of the outer wall 25 face each other. The outer surface 41b is positioned on an opposite side of the inner surface 41a and faces outward in the radial direction (substantially in the −Y direction). The front edge 41c is provided at an end of the plate portion 41 in the +X direction. The rear edge 41d is positioned on an opposite side of the front edge 41c.

As shown in FIG. 2, the plate portion 41 is provided with a notch 45 and a hole 46. The notch 45 is an example of a second notch. The hole 46 is an example of a first hole. The notch 45 and the hole 46 penetrate the plate portion 41 substantially in the radial direction (substantially in the Y direction) and are open to the inner surface 41a and the outer surface 41b. The notch 45 communicates with the front edge 41c and is opened in the +X direction. In the present embodiment, the +X direction is an example of a second direction. The hole 46 is a so-called round hole and is separated in the axial direction from an edge of the plate portion 41 and the notch 45.

The notch 45 and the hole 46 are linearly arranged at an interval in the X direction. In other words, the notch 45 and the hole 46 are disposed at substantially the same position in the circumferential direction. The hole 46 is separated from the notch 45 in the −X direction.

The cylindrical portion 42 is connected to the plate portion 41 at a position separated from the notch 45 and the hole 46 in a direction intersecting the axial direction. In the present embodiment, the cylindrical portion 42 is separated from the notch 45 and the hole 46 substantially in the +Z direction (substantially in the circumferential direction).

The cylindrical portion 42 protrudes from the outer surface 41b of the plate portion 41. The cylindrical portion 42 is formed in a substantially cylindrical shape substantially orthogonal to the outer surface 41b. The cylindrical portion 42 is provided with two openings 48. Each of the openings 48 is, for example, a notch, and communicates an inside and outside of the cylindrical portion 42. The two openings 48 are provided at both ends of the cylindrical portion 42 in the axial direction.

The nut 31 is housed inside the cylindrical portion 42. Accordingly, the cylindrical portion 42 holds the nut 31. The two openings 48 of the cylindrical portion 42 communicate with the threaded hole 35 of the nut 31. In other words, the openings 48 expose the threaded hole 35 of the nut 31 housed in the cylindrical portion 42 to outside of the cylindrical portion 42.

For example, the auxiliary claw 43 protrudes inward in the radial direction from one end of the plate portion 41 in the −Z direction, in a vicinity of the front edge 41c. The auxiliary claw 43 is adjacent to one of the two side walls 26 of the stay 22. The auxiliary claw 43 is slightly separated from the side wall 26.

The EA plate 33 is made of metal, for example, and has an intervening portion 51 and two deformation portions 52. The intervening portion 51 is formed in a plate shape substantially parallel to the outer wall 25 of the stay 22. The intervening portion 51 is positioned between the outer wall 25 and the plate portion 41. The intervening portion 51 includes an inner surface 51a and an outer surface 51b shown in FIG. 3, and a front edge 51c and a rear edge 51d shown in FIG. 2.

As shown in FIG. 3, the inner surface 51a is formed substantially flat and faces inward in the radial direction (substantially in the +Y direction). The inner surface 51a of the intervening portion 51 and the outer surface 25b of the outer wall 25 abut on each other. The outer surface 51b is positioned on an opposite side of the inner surface 51a. The outer surface 51b is formed substantially flat and faces outward in the radial direction (substantially in the −Y direction). The outer surface 51b of the intervening portion 51 and the inner surface 41a of the plate portion 41 abut on each other. As shown in FIG. 2, the front edge 51c is provided at an end of the intervening portion 51 in the +X direction. The rear edge 51d is positioned on an opposite side of the front edge 51c.

The intervening portion 51 is provided with a notch 54 and a hole 55. The notch 54 and the hole 55 penetrate the intervening portion 51 substantially in the radial direction (substantially in the Y direction) and are open to the inner surface 51a and the outer surface 51b. The notch 54 communicates with the front edge 51c and is opened in the +X direction. The hole 55 is a so-called round hole, and is separated from an edge of the intervening portion 51 and the notch 54.

The notch 54 and the hole 55 are linearly arranged at an interval in the X direction. In other words, the notch 54 and the hole 55 are disposed at substantially the same position in the circumferential direction. The hole 55 is separated from the notch 54 in the −X direction.

The notch 27 of the outer wall 25, the hole 46 of the plate portion 41, and the hole 55 of the intervening portion 51 communicate with each other. Moreover, the hole 28 of the outer wall 25, the notch 45 of the plate portion 41, and the notch 54 of the intervening portion 51 communicate with each other.

Each of the two deformation portions 52 includes a first straight portion 57, a second straight portion 58, and a curved portion 59. The first straight portions 57 extend substantially in the +X direction from the front edge 51c of the intervening portion 51. Each of the second straight portions 58 passes through a space between the outer wall 25 and the outer surface 21a of the inner tube 21, and extends substantially in the axial direction.

The curved portions 59 connect each of the first straight portions 57 in the +X direction and an end portion of each of the second straight portions 58 in the +X direction. Each of the curved portions 59 extends in a substantially arc shape at a position separated from the front edge 25c of the outer wall 25 substantially in the +X direction. Note that the deformation portions 52 are not limited to this example.

The two deformation portions 52 are disposed substantially in parallel at positions separated from each other in the circumferential direction. In the circumferential direction, between the two deformation portions 52, there are disposed the notch 27 and hole 28 of the outer wall 25, the notch 45 and hole 46 of the plate portion 41, and the notch 54 and hole 55 of the intervening portion 51.

The drive device 16 includes a screw 61 and a drive mechanism 62. The screw 61 extends substantially in the axial direction at a position separated outward in the radial direction from the inner tube 21. An external thread, which is a trapezoidal thread for example, is provided on an outer surface of the screw 61. The screw 61 passes through the threaded hole 35 of the nut 31, and fits the external thread of the screw 61 and the internal thread of the threaded hole 35 to each other. Accordingly, the screw 61 is attached to the nut 31.

The drive mechanism 62 is attached to the housing 14. The drive mechanism 62 is connected to an end of the screw 61 in the +X direction. The drive mechanism 62 includes, for example, a motor and a speed reducer. When the motor rotates an output shaft of the motor, the speed reducer transmits the rotation of the motor to the screw 61. Accordingly, the drive mechanism 62 rotates the screw 61 about an axis Ax2 of the screw 61.

The first fixing member 17 is, for example, a rivet such as a blind rivet. Note that the first fixing member 17 may include other members, such as a screw and a nut, which fix a plurality of members to each other.

The first fixing member 17 passes through the notch 27 of the outer wall 25, the hole 46 of the plate portion 41, and the hole 55 of the intervening portion 51, and fixes the stay 22, the attachment 32, and the EA plate 33 to each other. In other words, the first fixing member 17 fixes the tube 13 and the moving member 15 to each other. The first fixing member 17 is provided in the moving member 15 by being disposed through the hole 46 of the plate portion 41.

Each of a width of the notch 27 and diameters of the holes 46 and 55 is slightly longer than a diameter of a shaft of the first fixing member 17 (rivet). The first fixing member 17 restricts the stay 22, the attachment 32, and the EA plate 33 from relatively moving in directions (the X direction and the Z direction) intersecting a direction in which the shaft of the first fixing member 17 extends.

The restriction portion 18 includes a second fixing member 18a. The second fixing member 18a is, for example, a rivet such as a blind rivet. Note that the second fixing member 18a may include other members, such as a screw and a nut, which fix a plurality of members to each other.

The second fixing member 18a passes through the hole 28 of the outer wall 25, the notch 45 of the plate portion 41, and the notch 54 of the intervening portion 51, and fixes the stay 22, the attachment 32, and the EA plate 33 to each other. In other words, the second fixing member 18a fixes the tube 13 and the moving member 15 to each other. The second fixing member 18a is separated in the axial direction from the first fixing member 17.

Each of widths of the notches 45 and 54 and a diameter of the hole 28 is slightly longer than a diameter of a shaft of the second fixing member 18a (rivet). The second fixing member 18a restricts the stay 22, the attachment 32, and the EA plate 33 from relatively moving in a direction in which the shaft of the second fixing member 18a extends.

The second fixing member 18a is provided through the hole 28 of the outer wall 25. Therefore, the second fixing member 18a is movable integrally with the tube 13 in the axial direction. That is, it can be said that the second fixing member 18a of the restriction portion 18 is attached to the tube 13 and provided on the tube 13.

Because the nut 31 is held by the cylindrical portion 42 of the attachment 32, the nut 31 moves along with the rotation of the screw 61 in the axial direction. Accordingly, the attachment 32 that holds the nut 31, and the EA plate 33 and tube 13 fixed to the attachment 32 by the first fixing member 17 and the second fixing member 18a move in the axial direction. That is, the drive device 16 moves the moving member 15 in the axial direction. Note that the drive device 16 is not limited to the above-described mechanism using the nut 31 and the screw 61, and another mechanism may move the moving member 15 in the axial direction.

The drive device 16 integrally moves the steering shaft 11, the steering wheel 12, the tube 13, and the moving member 15 in the axial direction. That is, the steering device 10 includes, for example, the tube 13, the moving member 15, and the drive device 16, and has a telescopic mechanism that brings the steering wheel 12 closer to or moves away from a driver.

The nut 31 and the first fixing member 17 are separated from each other substantially in the Z direction (substantially in the circumferential direction) intersecting the axial direction. Therefore, when the drive device 16 moves the nut 31 in the axial direction, rotational moment about a rotational center axis Ax3 is generated in the tube 13 and the moving member 15, the rotational center axis Ax3 being positioned between the nut 31 and the first fixing member 17 in the Z direction and intersecting the axis Ax1, for example. Note that the rotational center axis Ax3 shown in FIG. 2 is an example.

Meanwhile, the second fixing member 18a of the restriction portion 18 passes through the hole 28 and the notches 45 and 54, and fixes the tube 13 and the moving member 15. The second fixing member 18a is separated from the nut 31 substantially in the Z direction and is separated from the first fixing member 17 in the axial direction. Therefore, the second fixing member 18a restricts the tube 13 and the moving member 15 relatively rotating about the rotational center axis Ax3.

In other words, because the nut 31 and the second fixing member 18a are separated from each other substantially in the Z direction, rotational moment about the rotational center axis Ax3 is generated in the tube 13 and the moving member 15. In this case, the first fixing member 17 restricts the tube 13 and the moving member 15 relatively rotating about the rotational center axis Ax3.

As shown in FIG. 4, the two claws 29 are provided between the first fixing member 17 passing through the notch 27 and an outside of the outer wall 25. Moreover, the width of the notch 27 between the two claws 29 is shorter than the diameter of the shaft of the first fixing member 17 (rivet). Therefore, the two claws 29 restrict the first fixing member 17 passing through the notch 27 from moving in the −X direction with respect to the tube 13.

The first fixing member 17 and the second fixing member 18a hold the outer wall 25, the plate portion 41, and the intervening portion 51 in the radial direction, for example, thereby restricting the tube 13 and the moving member 15 relatively moving in the axial direction due to friction. Moreover, the claws 29 restrict movement of the first fixing member 17, thereby restricting the tube 13 and the moving member 15 from relatively moving in the axial direction. Accordingly, the tube 13 and the moving member 15 can move integrally in the axial direction.

For example, due to collision of the vehicle 1, a large amount of load (collision load) in the +X direction may act on the steering wheel 12 from the driver. In this case, the collision load is input to the tube 13 via the steering wheel 12 and the steering shaft 11.

Figure 5:
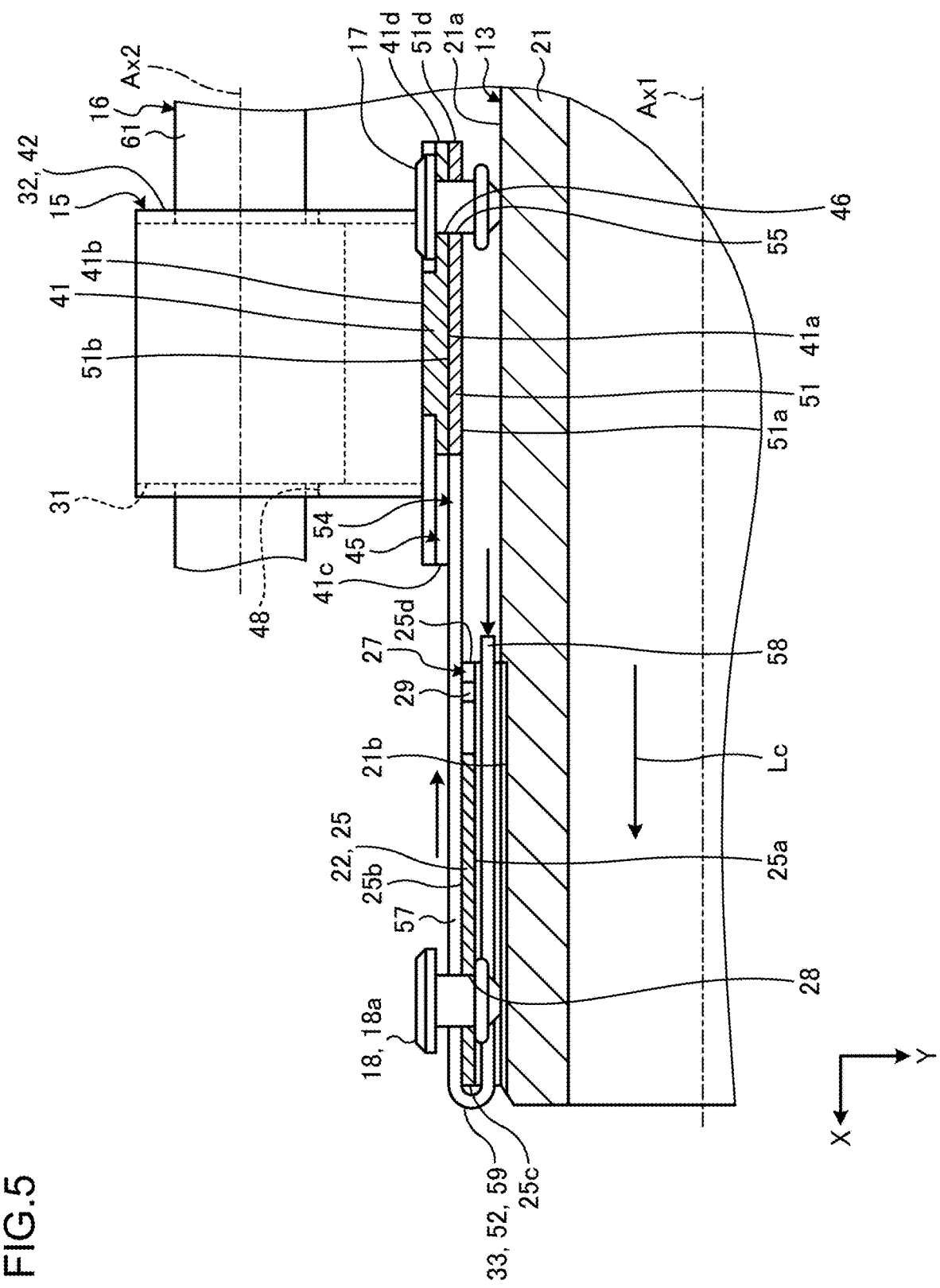
FIG. 5 is a cross-sectional view showing a part of the tube, moving member, and drive device at a time of collision according to the first embodiment.

FIG. 5 is a cross-sectional view showing a part of the tube 13, moving member 15, and drive device 16 at a time of collision according to the first embodiment. As shown in FIG. 5, collision load Lc is load in a direction in which the tube 13 on which the collision load Lc acts, and the moving member 15 held by the vehicle body of the vehicle 1 via the drive device 16 and the housing 14 are relatively moved in the axial direction. Specifically, the collision load Lc acting on the tube 13 is load in a direction of moving the moving member 15 in the −X direction with respect to the tube 13.

For example, the collision load Lc acts on the tube 13 to move the tube 13 substantially in the +X direction. Meanwhile, the drive device 16 is attached to the vehicle body of the vehicle 1 via the housing 14, and the nut 31 of the moving member 15 is attached to the screw 61 of the drive device 16. The screw 61 provided with the external thread, which is the trapezoidal thread, can hold the nut 31 when load in the axial direction acts on the nut 31. Therefore, the moving member 15 including the nut 31, the attachment 32 that holds the nut 31, and the EA plate 33 fixed to the attachment 32 by the first fixing member 17 remains at the same position when the collision load Lc acts on the tube 13. Therefore, the collision load Lc relatively moves the tube 13 and the moving member 15.

Figure 6:
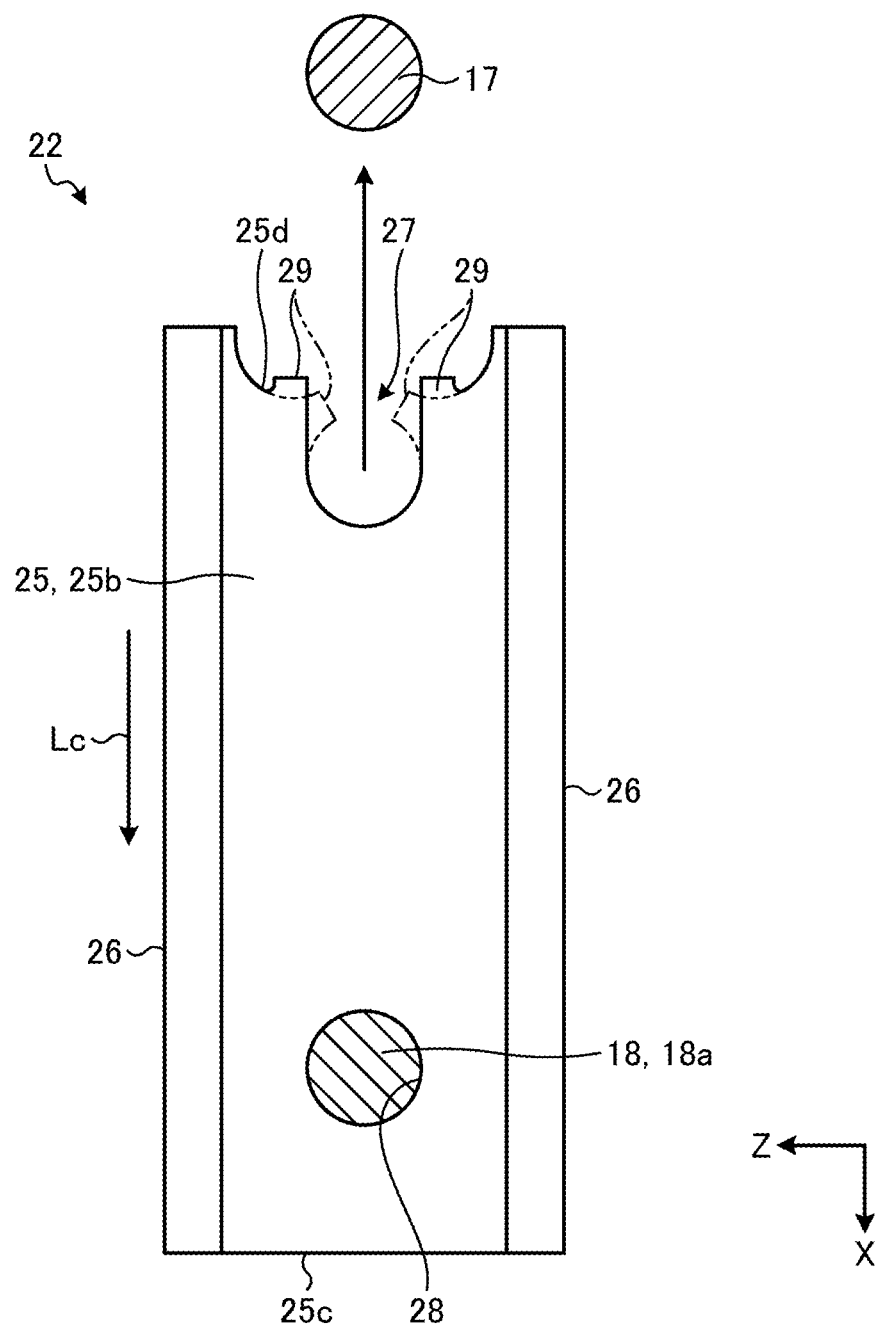
FIG. 6 is a side view showing the stay at the time of the collision according to the first embodiment.

FIG. 6 is a side view showing the stay 22 at the time of the collision according to the first embodiment. As shown in FIG. 6, when the moving member 15 moves in the −X direction with respect to the tube 13, the first fixing member 17 passing through the holes 46 and 55 of the plate portion 41 and the intervening portion 51 moves in the −X direction with respect to the tube 13 together with the moving member 15.

The two claws 29 restrict the first fixing member 17 from moving in the −X direction with respect to the tube 13. However, when the collision load Lc exceeding a predetermined magnitude acts on the tube 13, the first fixing member 17 plastically deforms the two claws 29 and increases the width of the notch 27 between the two claws 29. When the width of the notch 27 between the two claws 29 becomes equal to or wider than the diameter of the shaft of the first fixing member 17 (rivet), the first fixing member 17 is released from the notch 27 in the −X direction.

Meanwhile, when the moving member 15 moves in the −X direction with respect to the tube 13, the second fixing member 18a passing through the notches 45 and 54 of the plate portion 41 and intervening portion 51 moves in the +X direction with respect to the moving member 15 together with the tube 13. The second fixing member 18a is released in the +X direction from the notches 45 and 54 opened in the +X direction.

As shown in FIG. 5, when the moving member 15 moves in the −X direction with respect to the tube 13, the curved portions 59 of the deformation portions 52 abut on the front edge 25c of the outer wall 25. When the moving member 15 further moves in the −X direction with respect to the tube 13, a part of each of the deformation portions 52 that has been a curved portion 59 is extended and moves in the −X direction to become a part of each of the first straight portions 57. Meanwhile, a part of each of the deformation portions 52 that has been a second straight portion 58 moves in the +X direction and is bent by the front edge 25c of the outer wall 25 to become a new curved portion 59.

As described above, the front edge 25c of the outer wall 25 rubs the deformation portions 52 such that a part of the deformation portions 52 transition from the second straight portions 58 to the first straight portions 57 via the curved portions 59 along with the movement of the moving member 15 with respect to the tube 13. That is, along with the movement of the moving member 15 with respect to the tube 13, the tube 13 plastically deforms the deformation portions 52 provided on the moving member 15.

The steering device 10 can move the tube 13 with respect to the moving member 15 while absorbing collision energy with plastic deformation of the deformation portions 52. Accordingly, reaction force of the collision load Lc acting on the driver from the steering wheel 12 moving together with the tube 13 is reduced.

As described above, the tube 13 and the moving member 15 are relatively movable, and the deformation portions 52 deformed along with the relative movement of the tube 13 and the moving member 15 absorbs the collision energy. That is, the steering device 10 includes, for example, the tube 13 and the moving member 15, and has a collision energy absorbing mechanism that absorbs collision energy and reduces reaction force to the driver.

As described above, at the time of the collision, the first fixing member 17 is released from the notch 27, and the second fixing member 18a is released from the notches 45 and 54. In this case, the auxiliary claw 43 abuts on the side walls 26 of the stay 22, and thus the tube 13 and the moving member 15 can be restricted from relatively rotating about the rotational center axis Ax3.

In the steering device 10 according to the first embodiment described above, the drive device 16 moves the moving member 15 in the axial direction. The first fixing member 17 fixes the tube 13 and the moving member 15 to each other. The restriction portion 18 provided on the tube 13 is provided on the moving member 15, is separated from the first fixing member 17 in the axial direction, and restricts the tube 13 and the moving member 15 relatively rotating about the rotational center axis Ax3 intersecting the axis Ax1 of the steering shaft 11. Due to arrangement of the moving member 15 moved by the drive device 16 and the first fixing member 17 fixing the moving member 15 and the tube 13, a force for rotating about the above-described rotational center axis Ax3 (rotational moment) may be generated when the drive device 16 moves the moving member 15 in the axial direction. However, the first fixing member 17 and the restriction portion 18 are separated from each other in the axial direction, and inhibit the tube 13 and the moving member 15 from relatively rotating by the above-described rotating force when the drive device 16 moves the moving member 15 in the axial direction. Therefore, the steering device 10 can smoothly move the moving member 15, the tube 13, and the steering shaft 11 in the axial direction regardless of the arrangement of the moving member 15 and the first fixing member 17. Accordingly, flexibility of arrangement of parts in the steering device 10 is also increased.

For example, as described above, when the nut 31 and the first fixing member 17 are separated from each other substantially in the Z direction (substantially in the circumferential direction), rotational moment is generated. However, provided with the restriction portion 18, the steering device 10 can inhibit the rotation of the moving member 15 with respect to the tube 13 due to the rotational moment, and can smoothly transmit to the tube 13 force by which the drive device 16 moves the moving member 15 in the axial direction. Therefore, in the steering device 10, it is not necessary to coaxially dispose the nut 31 and the first fixing member 17, and, as in the present embodiment, the nut 31 can be disposed at a position separated (offset) in the substantially +Z direction with respect to the first fixing member 17.

Furthermore, for example, due to a collision of the vehicle 1, predetermined load may act on the tube 13 in a direction in which the moving member 15 is relatively moved in the −X direction with respect to the tube 13. Along with the movement of the moving member 15 with respect to the tube 13, the stay 22 of the tube 13 plastically deforms the deformation portions 52 provided on the EA plate 33 of the moving member 15. Because collision energy is absorbed by the plastic deformation of the deformation portions 52, reaction force that the driver receives from the steering wheel 12 is reduced. The deformation portions 52 are provided on one EA plate 33. That is, due to the plastic deformation, only one deformation portion 52 that absorbs the collision energy of the vehicle 1 is required, improving mountability of the steering device 10 on the vehicle 1. Furthermore, because the tube 13 and the moving member 15 are fixed by at least the first fixing member 17, the tube 13 and the moving member 15 can be fixed to each other without passing through other parts, and the number of parts used in the steering device 10 can be reduced.

The first fixing member 17 is disposed through the hole 46 provided in the moving member 15 and the notch 27 provided in the tube 13 and opened in the −X direction. The restriction portion 18 is disposed through the notch 45 provided in the moving member 15 and opened in the +X direction. For example, when the predetermined load acts on the tube 13 due to the collision of the vehicle 1, the first fixing member 17 is released from the notch 27 in the −X direction, and the restriction portion 18 is released from the notch 45 in the +X direction. Accordingly, the steering device 10 can inhibit the first fixing member 17 and the restriction portion 18 from hindering operation of absorbing the collision energy described above.

The drive device 16 includes the screw 61 extending in the axial direction and the drive mechanism 62 that rotates the screw 61 about the axis Ax2 of the screw 61. The moving member 15 includes the nut 31. The nut 31 is attached to the screw 61 and moves in the axial direction along with the rotation of the screw 61. The nut 31 and the first fixing member 17 are separated from each other substantially in the Z direction (substantially in the circumferential direction) intersecting the axial direction. In a case where the nut 31 and the first fixing member 17 are disposed at the positions, the above-described force for rotating about the above-described rotational center axis Ax3 is generated when the drive device 16 moves the nut 31 in the axial direction. However, the first fixing member 17 and the restriction portion 18 inhibit the tube 13 and the moving member 15 from relatively rotating by the above-described rotating force when the drive device 16 moves the nut 31 in the axial direction. Therefore, the steering device 10 can smoothly move the moving member 15, the tube 13, and the steering shaft 11 in the axial direction regardless of the arrangement of the nut 31 and the first fixing member 17.

The tube 13 has the claws 29 that restrict the first fixing member 17 passing through the notch 27 from moving in the −X direction with respect to the tube 13. Therefore, in a normal state where load that causes the first fixing member 17 to plastically deform the claws 29 does not act on the tube 13, the tube 13 and the steering shaft 11 can smoothly move in the axial direction along with the movement of the moving member 15 by the drive device 16. Moreover, as compared to a case where the claws 29 are broken, the claws 29 can stabilize a magnitude of load input to the tube 13 by being plastically deformed by the first fixing member 17, the load starting operation of absorbing the collision energy described above.

The restriction portion 18 includes the second fixing member 18a that passes through the notch 45 and the hole 28 provided in the tube 13 and fixes the tube 13 and the moving member 15 to each other. Accordingly, in the normal state, the tube 13 and the moving member 15 are fixed by the two fixing members of the first fixing member 17 and the second fixing member 18a. Therefore, rigidity of the steering device 10 at the normal state is improved.

Second Embodiment

Hereinafter, a second embodiment will be described with reference to FIG. 7. Note that, in the following description of a plurality of embodiments, components having functions similar to those of the components already described are denoted by the same reference signs as those of the components already described, and the description thereof may be further omitted. Furthermore, the plurality of components denoted by the same reference signs do not necessarily have all the functions and properties in common, and may have different functions and properties according to each embodiment.

Figure 7:
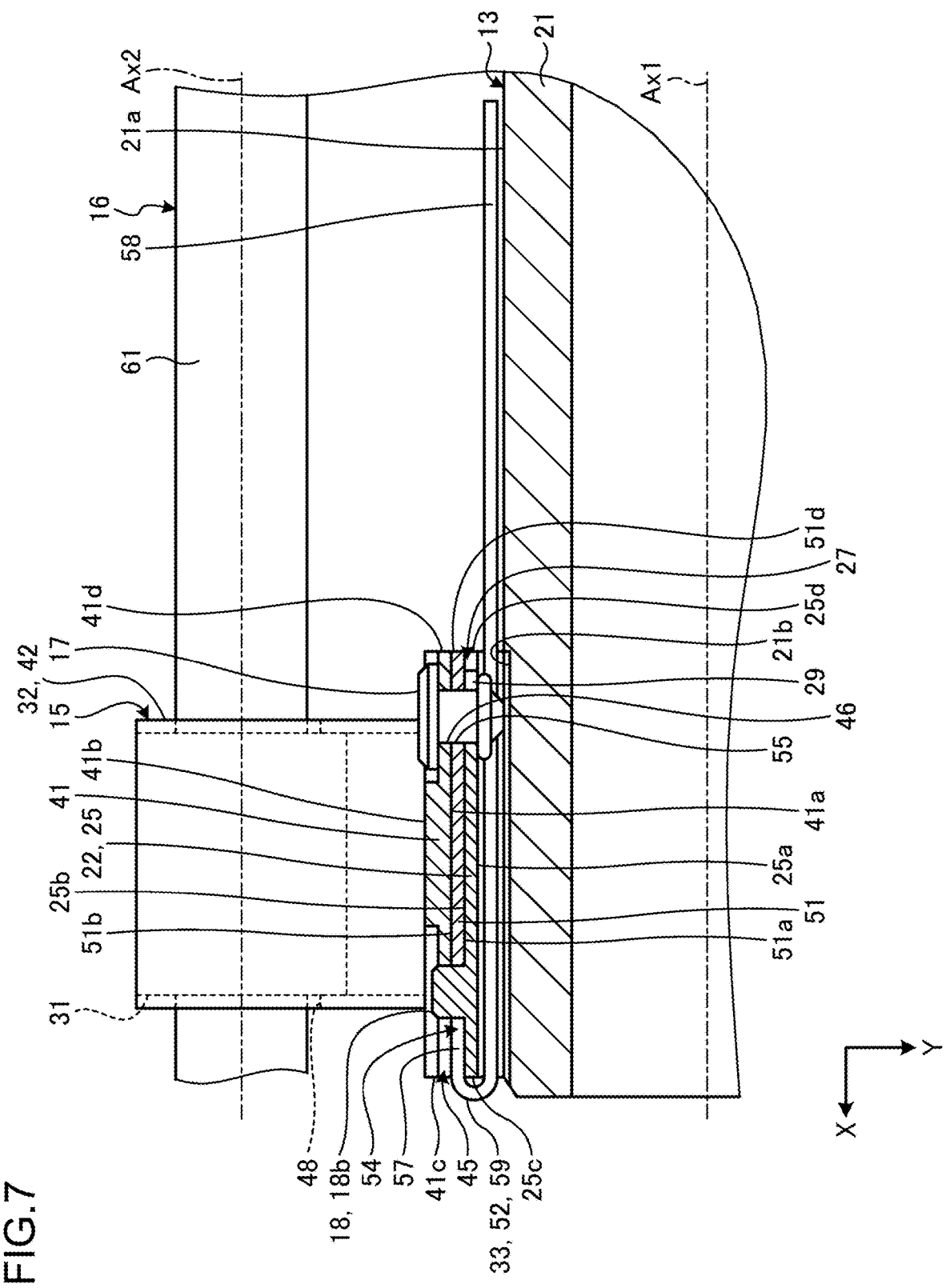
FIG. 7 is a cross-sectional view showing a part of a tube, moving member, and drive device according to a second embodiment.

FIG. 7 is a cross-sectional view showing a part of a tube 13, moving member 15, and drive device 16 according to the second embodiment. As shown in FIG. 7, a restriction portion 18 of the second embodiment includes an engagement protrusion 18b instead of a second fixing member 18a. Furthermore, in a stay 22 of the second embodiment, a hole 28 is omitted.

The engagement protrusion 18b protrudes from an outer surface 25b of an outer wall 25 so as to pass through notches 45 and 54 of a plate portion 41 and intervening portion 51. Same as the second fixing member 18a of the first embodiment, the engagement protrusion 18b restricts the tube 13 and the moving member 15 relatively rotating about a rotational center axis Ax3. When collision load Lc exceeding a predetermined magnitude acts on the tube 13, a second fixing member 18a is released in a +X direction from the notches 45 and 54 opened in the +X direction.

In a steering device 10 of the second embodiment described above, the restriction portion 18 includes the engagement protrusion 18b protruding from the stay 22 of the tube 13 so as to pass through the notch 45. Accordingly, the steering device 10 is not necessary to be provided with the restriction portion 18 as a part different from the tube 13, and the number of parts can be reduced, and thus, assembly work of the steering device 10 can be facilitated.

Third Embodiment

Figure 8:
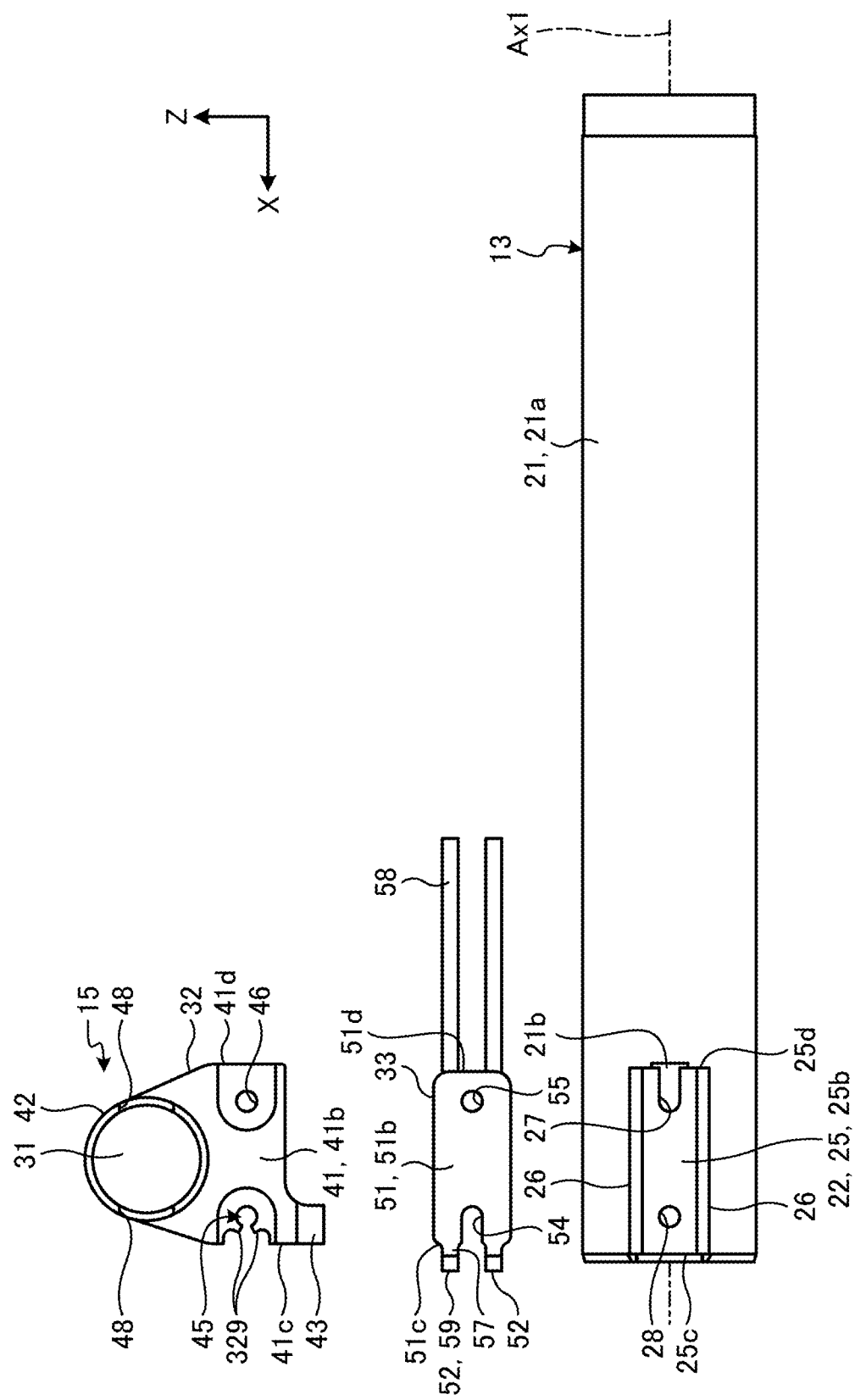
FIG. 8 is an exploded side view showing a tube, moving member, and drive device according to a third embodiment.

Hereinafter, a third embodiment will be described with reference to FIG. 8. FIG. 8 is an exploded side view showing a tube 13, moving member 15, and drive device 16 according to the third embodiment.

In the third embodiment, the tube 13 is an example of a first member, the moving member 15 is an example of a second member, a first fixing member 17 is an example of a restriction portion and a second fixing member, and a second fixing member 18a is an example of a first fixing member. Furthermore, in the third embodiment, a notch 27 is an example of a second notch, a hole 28 is an example of a first hole, a notch 45 is an example of a first notch, and a hole 46 is an example of a second hole.

In the third embodiment, a plate portion 41 has two claws 329. The claws 329 are an example of a deformable protrusion. Furthermore, the claws 29 are omitted from an outer wall 25 of the third embodiment. The two claws 329 protrude from two facing edges of the notch 45 in a vicinity of a front edge 41c. The notch 45 is narrowed at a portion where the claws 329 are provided.

The two claws 329 are provided between the second fixing member 18a passing through the notch 45 and an outside of an attachment 32. Moreover, a width of the notch 45 between the two claws 329 is shorter than a diameter of a shaft of the second fixing member 18a (rivet). Therefore, the two claws 329 restrict the second fixing member 18a passing through the notch 45 from moving in a +X direction with respect to the moving member 15.

Collision load Lc acting on the tube 13 is load in a direction of moving the tube 13 in the +X direction with respect to the moving member 15. That is, in the third embodiment, the +X direction is an example of a first direction, and a −X direction is an example of a second direction.

When the collision load Lc exceeding a predetermined magnitude acts on the tube 13, the second fixing member 18a plastically deforms the two claws 329 and is released in the +X direction from the notches 45 and 54. Meanwhile, the first fixing member 17 is released from the notch 27 in the −X direction.

As in the third embodiment described above, the claws 29 and 329 may be provided on at least one of the tube 13 and the moving member 15. That is, the tube 13 may be provided with the claws 29, and the moving member 15 may be provided with the claws 329.

In the plurality of embodiments described above, a stay 22 of a tube 13 plastically deforms deformation portions 52 of an EA plate 33. However, the deformation portion may be provided in the tube, and a moving member may plastically deform the deformation portion.

In the above description, inhibition is defined as, for example, preventing occurrence of an event, an action, or an influence, or reducing a degree of the event, the action, or the influence. Furthermore, in the above description, restriction is defined as, for example, preventing movement or rotation, or allowing movement or rotation within a predetermined range and preventing movement or rotation beyond the predetermined range.

The embodiments of the present disclosure have been exemplified above, but the above-described embodiments and modifications thereof are merely examples, and are not intended to limit the scope of the disclosure. The embodiments and modifications described above may be implemented in a variety of other forms, and various omissions, substitutions, combinations, and changes may be made without departing from the gist of the disclosure. Furthermore, a configuration and shape of each embodiment and each modification may be partially interchanged.

The invention claimed is:

1. A steering device comprising:
a tube in which a steering shaft is attached so as to be rotatable about an axis of the steering shaft;
a housing that holds the tube movably in an axial direction along an axis of the steering shaft;
a moving member;
a drive device that is attached to the housing and moves the moving member in the axial direction;
a first fixing member that is provided on one first member that is either one of the tube and the moving member, and fixes the tube and the moving member to each other; and
a restriction portion that is provided on a second member that is either another one of the tube and the moving member, is separated from the first fixing member in the axial direction, and restricts the tube and the moving member relatively rotating about a rotational center axis intersecting an axis of the steering shaft, wherein
when predetermined load acts on the tube in a direction in which the first member is relatively moved in a first direction included in the axial direction with respect to the second member, one of either the first member or the second member plastically deforms a deformation portion provided on another of either the first member or the second member, along with movement of the first member with respect to the second member, wherein
the first fixing member passes through a first hole provided in the first member, and a first notch provided in the second member and opened in the first direction, and fixes the tube and the moving member to each other,
the restriction portion passes through a second notch provided in the first member and opened in a second direction opposite to the first direction, and restricts the tube and the moving member from relatively rotating about the rotational center axis, and
when the predetermined load acts on the tube in a direction in which the first member is relatively moved in the first direction with respect to the second member, the first fixing member is released from the first notch in the first direction, and the restriction portion is released from the second notch in the second direction.

2. The steering device according to claim 1, wherein
the drive device includes a screw extending in the axial direction, and a drive mechanism that rotates the screw about an axis of the screw,
the moving member includes a nut attached to the screw and moves in the axial direction along with rotation of the screw, and
the nut and the first fixing member are separated from each other in a direction intersecting the axial direction.

3. The steering device according to claim 2, wherein
the second member includes a deformable protrusion that restricts the first fixing member passing through the first notch from moving in the first direction with respect to the second member.

4. The steering device according to claim 1, wherein
the restriction portion includes a second fixing member that passes through the second notch and a second hole provided in the second member, and fixes the tube and the moving member to each other.

5. The steering device according to claim 1, wherein
the restriction portion includes an engagement protrusion protruding from the second member so as to pass through the second notch.

* * * * *